(No Model.)
C. G. CURTIS.
ELASTIC FLUID TURBINE.
No. 590,211. Patented Sept. 21, 1897.
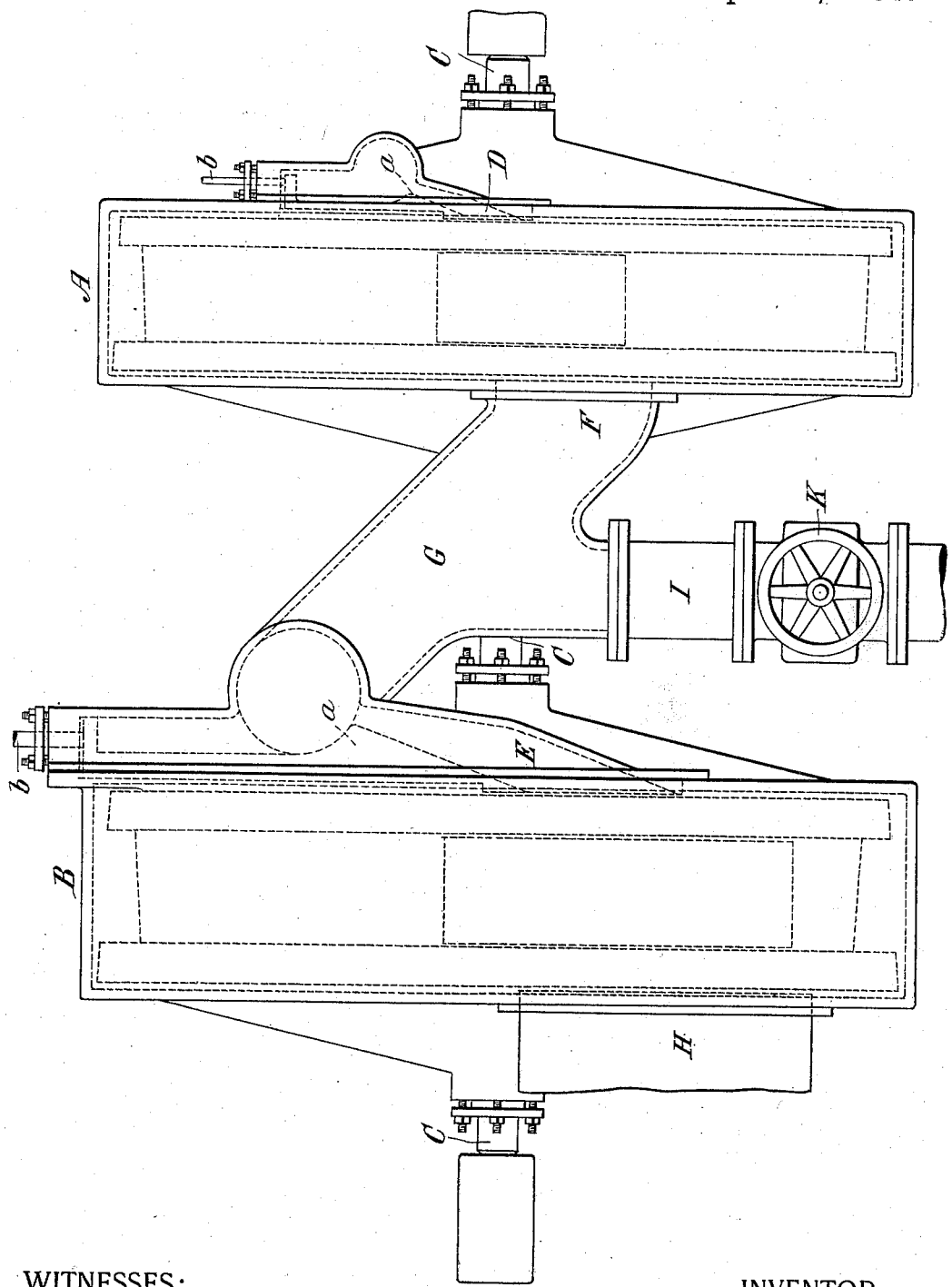
WITNESSES:
C. E. Ashley
H. W. Lloyd.
INVENTOR:
Charles G. Curtis
By his Attorneys
Dyer & Driscoll.

UNITED STATES PATENT OFFICE.

CHARLES G. CURTIS, OF NEW YORK, N. Y., ASSIGNOR TO THE CURTIS COMPANY, OF SAME PLACE.

ELASTIC-FLUID TURBINE.

SPECIFICATION forming part of Letters Patent No. 590,211, dated September 21, 1897.

Application filed January 19, 1897. Serial No. 619,743. (No model.)

*To all whom it may concern:*

Be it known that I, CHARLES G. CURTIS, a citizen of the United States, residing at New York city, in the county and State of New York, have invented a certain new and useful Improvement in Elastic-Fluid Turbines, of which the following is a specification.

The object I have in view is to produce an elastic-fluid turbine which may be operated either as a condensing or a non-condensing engine with equally high comparative efficiency.

In an application for patent already filed by me, Serial No. 601,601, filed August 4, 1896, I have described and claimed an elastic-fluid turbine comprising means for utilizing the elastic fluid at different ratios of expansion, whereby the turbine may be used either as a condensing or a non-condensing engine.

The present invention is an improvement in the specific means for accomplishing the object of the invention set forth in my prior application referred to.

In carrying out my present invention I divide my turbine into two parts mounted upon a common shaft, one of such parts being adapted to convert into *vis viva* the pressure of the elastic fluid from the initial pressure down to approximately atmospheric pressure and to transform into mechanical power the *vis viva* so produced, and the other part being adapted to convert into *vis viva* the pressure of the elastic fluid from atmospheric pressure down to the pressure of a vacuum-exhaust and to transform into mechanical power the *vis viva* so developed. In other words, one part of the turbine is constructed to work with the highest practicable efficiency between the initial or boiler pressure and atmospheric pressure, or substantially atmospheric pressure, and the other part is constructed to work with corresponding efficiency between the atmospheric or terminal pressure of the first part of the turbine and a vacuum-exhaust. The conduit connecting the two parts of the turbine is provided with an atmospheric exhaust-opening adapted to be opened and closed by a suitable valve. When the combined machine is used as a condensing-engine, the atmospheric exhaust is closed and the elastic fluid passes through both parts of the turbine into the vacuum-exhaust. When used as a non-condensing engine, the atmospheric exhaust is opened and the elastic fluid passes through only the first part of the turbine and out at the atmospheric exhaust. It will be seen that whether working as a condensing or a non-condensing engine the first part of the turbine will be working under precisely the same conditions, and there being no change in the conditions of conversion of pressure into *vis viva* and transformation of *vis viva* into mechanical power the turbine can be constructed to give the highest practicable efficiency, which will be maintained whether the engine is working condensing or non-condensing, and it will further be observed that the conditions of governing the speed or power of the combined machine will not change with the change of the engine from condensing to non-condensing, or vice versa.

In the accompanying drawing, forming a part hereof, the figure illustrates a top view of the engine.

A and B are two wheels mounted upon the same shaft C and having separate inclosing shells. These wheels and shells form a combined turbine of the character described in my Patents Nos. 566,968 and 566,969. They are provided, preferably, with expansion delivery-nozzles D E, which have means for causing variations in the volume of the fluid-jet unaccompanied by substantial variations in its velocity, as described in my Patent No. 566,967. The particular means for accomplishing this is a sliding tongue *a*, connected by a stem *b* with a speed-governor, the special form of nozzle and sliding tongue being that described and claimed in an application already filed by me, Serial No. 601,605, filed August 4, 1896. The part A of the turbine is constructed on the principles set forth in my prior patents, to convert into *vis viva* the pressure of the elastic fluid from the initial or boiler pressure down to atmospheric pressure, or approximately atmospheric pressure, and to transform the *vis viva* so produced with high efficiency into mechanical power, while the part B of the turbine is constructed on like principles to do the same work between atmospheric pressure and the pressure of a vacuum-exhaust, the work in each case being very nearly equal with ordinary boiler-pressures and a good vacuum-exhaust.

F is the exhaust-port of the part A. This is connected by a conduit G with the nozzle E of the part B.

H is the exhaust-port of the part B, connected with a condenser or other means for producing less than atmospheric pressure. From the conduit G extends a pipe I, opening into the air and provided with a suitable valve K. When the engine is working as a condensing-engine, the valve K will be closed and the elastic fluid will pass through the two parts of the turbine in succession. When the engine is working as a non-condensing engine, the valve K will be open and the elastic fluid will exhaust from the conduit G into the air after passing through the part A and without passing through the part B.

What I claim is—

1. An elastic-fluid turbine adapted to operate either as a condensing or a non-condensing engine, and having in combination a portion constructed to convert into *vis viva* the pressure of the elastic fluid from the initial pressure down to about atmospheric pressure, and to transform such *vis viva* into mechanical power; a second portion constructed to convert into *vis viva* the pressure of the elastic fluid from about atmospheric pressure to the pressure of a vacuum-exhaust, and to transform such *vis viva* into mechanical power; a conduit connecting the two portions in succession; and means for connecting said intermediate conduit with an atmospheric exhaust, substantially as set forth.

2. In an elastic-fluid turbine adapted to operate either as a condensing or a non-condensing engine, the combination of two portions connected in succession, one constructed to work between the initial pressure and atmospheric pressure, and the other constructed to work between atmospheric pressure and the pressure of a vacuum-exhaust, such portions being provided with delivery-nozzles having means for producing variations in the volume of the elastic fluid unaccompanied by substantial variations in its velocity, and a connectible atmospheric exhaust located between the two portions, substantially as set forth.

This specification signed and witnessed this 8th day of January, 1897.

CHARLES G. CURTIS.

Witnesses:
 EUGENE CONRAN,
 JNO. R. TAYLOR.